(12) United States Patent
Tottori et al.

(10) Patent No.: US 11,447,194 B2
(45) Date of Patent: Sep. 20, 2022

(54) OPERATING MECHANISM OF WORK VEHICLE

(71) Applicant: Kubota Corporation, Osaka (JP)

(72) Inventors: Norita Tottori, Sakai (JP); Hironobu Nogami, Sakai (JP); Satoru Yamanaka, Sakai (JP); Tadashi Nakamura, Sakai (JP); Hideaki Ezaki, Sakai (JP); Masafumi Oshita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 447 days.

(21) Appl. No.: 16/701,444

(22) Filed: Dec. 3, 2019

(65) Prior Publication Data

US 2020/0198712 A1    Jun. 25, 2020

(30) Foreign Application Priority Data

Dec. 20, 2018   (JP) .............................. JP2018-238767

(51) Int. Cl.
| | | |
|---|---|---|
| *B62D 49/06* | (2006.01) | |
| *E02F 3/43* | (2006.01) | |
| *E02F 9/20* | (2006.01) | |
| *G05G 1/04* | (2006.01) | |

(52) U.S. Cl.
CPC .......... *B62D 49/0692* (2013.01); *E02F 3/431* (2013.01); *E02F 9/2004* (2013.01); *G05G 1/04* (2013.01)

(58) Field of Classification Search
CPC .... B62D 49/0692; E02F 3/431; E02F 9/2004; G05G 1/04
See application file for complete search history.

(56) References Cited

U.S. PATENT DOCUMENTS

| | | | | |
|---|---|---|---|---|
| 1,743,241 A | | 1/1930 | Schmidt | |
| 4,429,761 A | * | 2/1984 | Haddock, Jr. ............. | B66F 9/20 180/68.5 |
| 4,489,805 A | * | 12/1984 | Okabe ....................... | E02F 9/24 74/471 XY |

(Continued)

FOREIGN PATENT DOCUMENTS

| | | |
|---|---|---|
| FR | 2449924 A1 | 9/1980 |
| JP | S48109281 U | 12/1973 |

(Continued)

OTHER PUBLICATIONS

The extended European Search Report dated May 26, 2020, by the European Patent Office in corresponding European Application No. 19212830.4. Previously filed with the references on Jun. 12, 2020 with a wrong date listed for the European Search Report. (7 pages).

(Continued)

*Primary Examiner* — Tyler J Lee
(74) *Attorney, Agent, or Firm* — Buchanan Ingersoll & Rooney PC

(57) ABSTRACT

An operating mechanism of a work vehicle includes: an operating portion that is provided to a side console disposed beside a seat and can be operated by an operator; and a switching portion capable of switching between a used state in which the operating portion can be used and a non-used state in which the operating portion cannot be used.

18 Claims, 14 Drawing Sheets

(56) References Cited

U.S. PATENT DOCUMENTS

| | | | | |
|---|---|---|---|---|
| 4,526,055 A | * | 7/1985 | Batchelor | G05G 9/047 |
| | | | | 251/114 |
| 6,029,535 A | | 2/2000 | Kenny et al. | |
| 6,343,668 B1 | | 2/2002 | Dean | |
| 6,435,053 B1 | * | 8/2002 | Guiet | E02F 9/2004 |
| | | | | 74/473.26 |
| 2002/0066332 A1 | * | 6/2002 | Horikawa | G05G 1/04 |
| | | | | 74/491 |
| 2007/0020068 A1 | | 1/2007 | Tanaka et al. | |
| 2012/0065847 A1 | * | 3/2012 | Hobenshield | E02F 9/2004 |
| | | | | 701/50 |

FOREIGN PATENT DOCUMENTS

| | | |
|---|---|---|
| JP | S60202720 A | 10/1985 |
| JP | 2001329572 A | 11/2001 |
| JP | 2007002534 A | 1/2007 |
| JP | 6317378 B2 | 4/2018 |

OTHER PUBLICATIONS

The extended European Search Report dated May 6, 2020, by the European Patent Office in corresponding European Application No. 19212830.4. (7 pages).

Office Action (Notice of Reasons for Refusal) dated Nov. 30, 2021, by the Japanese Patent Office in corresponding Japanese Patent Application No. 2018-238767, and an English Translation of the Office Action. (7 pages).

\* cited by examiner

OPERATING MECHANISM OF WORK VEHICLE

TECHNICAL FIELD

The disclosure relates to a technique of an operating mechanism of a work vehicle for operating a device provided to the work vehicle.

BACKGROUND ART

Conventionally, there is a known technique related to an operating mechanism of a work vehicle for operating a device provided to the work vehicle. For example, such a technique is described in JP 2007-2534 A.

JP 2007-2534 A describes an operating mechanism including a loader lever (an operating portion) extending upward, a support body that supports a base of the loader lever such that the loader lever can rock, and a device cover that covers the support body. The loader lever (device cover) is disposed at a position in front of a gear shift guide, behind an entrance, and on an outer side of a leg of an operator (driver) seated in a driver's seat. Disposing the loader lever at this position suppresses obstruction of getting in and out of the operator by the loader lever.

However, there is still room for improvement of the technique described in JP 2007-2534 A because the rising loader lever may obstruct a motion (a movement, getting in and out, and the like) of the operator in some cases.

SUMMARY OF INVENTION

The disclosure has been made with the above-described circumstances in view and the object of the disclosure is to provide an operating mechanism of a work vehicle capable of suppressing obstruction of a motion of an operator by an operating portion.

The problem to be solved by the disclosure is as described above and a solution to the problem will be described next.

In other words, in claim 1, an operating mechanism of a work vehicle includes: an operating portion that is provided to a console disposed beside a seat and can be operated by an operator; and a switching portion capable of switching between a used state in which the operating portion can be used and a non-used state in which the operating portion cannot be used.

In claim 2, the switching portion switches from the used state to the non-used state by folding of the operating portion.

In claim 3, the operating mechanism of the work vehicle further includes a transmitting portion that transmits a motion to a predetermined device, in which the switching portion couples the operating portion to the transmitting portion such that the operating portion can rock, switches to the used state by restricting rocking of the operating portion with respect to the transmitting portion and enabling the transmitting portion to move in conjunction with operation of the operating portion, and switches to the non-used state by allowing the rocking of the operating portion with respect to the transmitting portion and rocking the operating portion to a predetermined position.

In claim 4, the predetermined device is a control valve that controls a motion of a front loader.

In claim 5, the switching portion couples the operating portion to the transmitting portion such that the operating portion can rock forward and backward.

In claim 6, the switching portion includes a first member fixed to the transmitting portion, a second member fixed to the operating portion, a coupling portion that couples the first member and the second member such that the first member and the second member can rock, and a restricting member that can restrict rocking of the second member with respect to the first member by being fitted over the first member and the second member in a state in which the second member rocks to a predetermined position with respect to the first member.

In claim 7, the restricting member is provided to one of the first member and the second member to be able to slide in such a direction as to move toward and away from the other of the first member and the second member.

In claim 8, the switching portion further includes a biasing member that biases the restricting member toward the other of the first member and the second member.

In claim 9, the operating mechanism of the work vehicle further includes a cover portion that covers the restricting member, in which the switching portion further includes a restriction operating portion that can operate the restricting member from outside the cover portion.

As effects of the disclosure, the disclosure exerts the following effects.

In claim 1, it is possible to suppress obstruction of a motion of an operator by the operating portion.

In claim 2, it is possible to more effectively suppress the obstruction of the motion of the operator by the operating portion.

In claim 3, it is possible to suppress the obstruction of the motion of the operator by the operating portion.

In claim 4, it is possible to suppress the obstruction of the motion of the operator by the operating portion for operating the front loader.

In claim 5, it is possible to suppress the obstruction of the motion of the operator in front of and behind the operating portion by the operating portion.

In claim 6, it is possible to make a configuration of the switching portion simple.

In claim 7, it is possible to make the configuration of the switching portion simpler.

In claim 8, it is possible to easily switch to the used state.

In claim 9, it is possible to easily switch between the used state and the non-used state.

DESCRIPTION OF EMBODIMENT

In the following description, directions shown by arrows U, D, F, B, L, and R in the figures are defined as upward, downward, forward, backward, leftward, and rightward directions, respectively.

Figure 1:
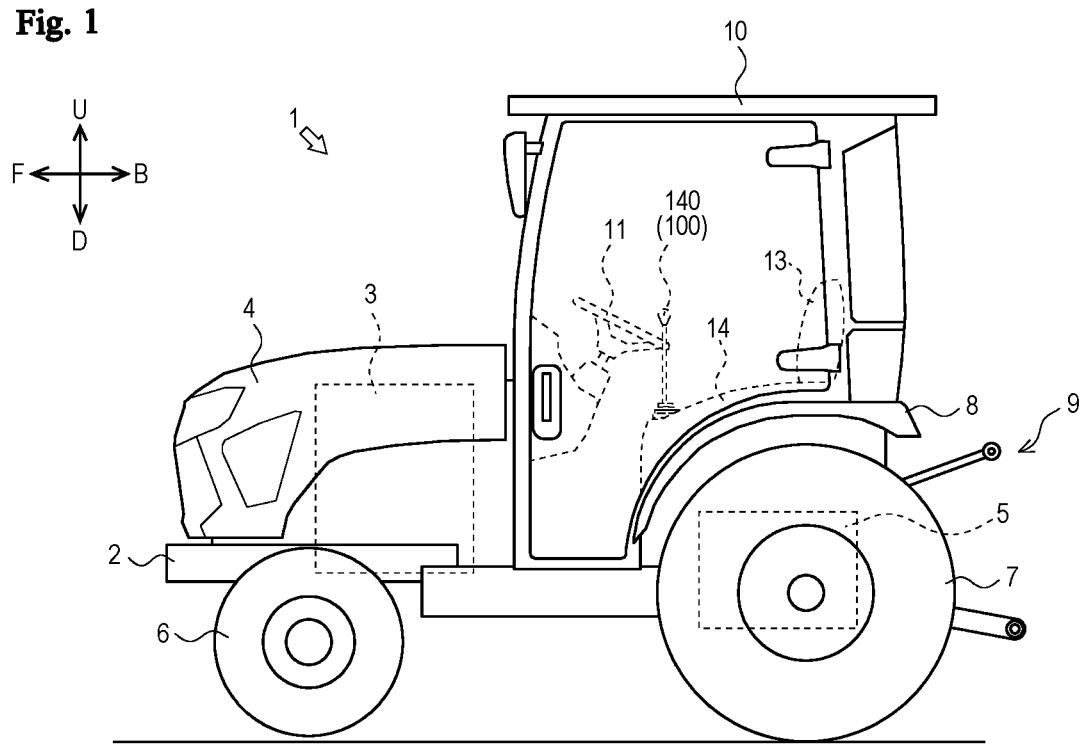
FIG. 1 is a side view of an overall configuration of a tractor according to an embodiment of the disclosure.

First, an overall configuration of a tractor 1 according to an embodiment of the disclosure will be described with reference to FIGS. 1 to 3.

The tractor 1 mainly includes a body frame 2, an engine 3, a hood 4, a transmission case 5, front wheels 6, rear wheels 7, fenders 8, a lift 9, a cabin 10, a steering wheel 11, a gear shift pedal 12, a seat 13, a side console 14, and the like.

The body frame 2 is a frame-shaped member formed by appropriately combining a plurality of panel members. The body frame 2 is formed in a substantially rectangular shape in plan view. The body frame 2 is disposed at a front portion of the tractor 1 with a longitudinal direction of the body frame 2 oriented in a front-back direction. The engine 3 is fixed to a rear portion of the body frame 2. The engine 3 is covered with the hood 4. The transmission case 5 is provided behind the engine 3.

A front portion of the body frame 2 is supported by the pair of left and right front wheels 6 through a front axle mechanism (not shown). A rear portion of the transmission case 5 is supported by the pair of left and right rear wheels 7 through a rear axle mechanism (not shown). The paired left and right rear wheels 7 are covered with the fenders 8 approximately from above.

The lift 9 is provided to the rear portion of the transmission case 5. Various work implements (e.g., a cultivator and the like) can be attached to the lift 9. The lift 9 can raise and lower the attached work implement with actuators such as hydraulic cylinders. It is possible to transmit power of the engine 3 to the lift 9 through a PTO (Power Takeoff) shaft (not shown).

The power of the engine 3 is changed in speed by a transmission (not shown) housed in the transmission case 5 and then can be transmitted to the front wheels 6 via the front axle mechanism and can be transmitted to the rear wheels 7 via the rear axle mechanism. The power of the engine 3 drives the front wheels 6 and the rear wheels 7 for rotation to thereby allow the tractor to travel. The power of the engine 3 can drive the work implement attached to the lift 9.

The cabin 10 is provided behind the engine 3. Inside the cabin 10, a living space which a driver gets into is formed. In a front portion of the cabin 10, the steering wheel 11 for adjusting a steering angle of the front wheels 6, the gear shift pedal 12 capable of changing a transmission gear ratio by the transmission, other various pedals, and the like are disposed. The seat 13 in which the driver sits is disposed substantially at the center of the cabin 10. The side console 14 is disposed to the right side of the seat 13. On the side console 14, various operating devices are arranged appropriately.

To put it concretely, an operating portion 140 (operating mechanism 100) for operating a front loader attached to the tractor 1 is provided to a front end portion of the side console 14. By operating the operating portion 140, various valves provided to a control valve 15 (see FIG. 4) are operated. By appropriately switching between hydraulic circuits by operating the valves, it is possible to control extension and retraction of hydraulic cylinders provided to the front loader to thereby control motions of the front loader.

Behind the operating portion 140, a position lever 16 for raising and lowering the work implement attached to the lift 9 and a cruise lever 17 for causing the tractor 1 to travel at a constant speed are provided. The position lever 16 and the cruise lever 17 are arranged on left and right sides and can be rocked respectively in the front-back direction.

Next, with reference to FIGS. 4 to 12, a configuration of the operating mechanism 100 for operating the front loader will be described concretely.

The operating mechanism 100 mainly includes a support portion 110, a transmitting portion 120, a switching portion 130, the operating portion 140, a lock lever 150, and a cover portion 160. FIGS. 4 to 10 show a state ("a used state" described later) in which the transmitting portion 120 can move while interlocking with operation of the operating portion 140. The configuration of the operating mechanism 100 will be described below based on this state.

Figure 4:
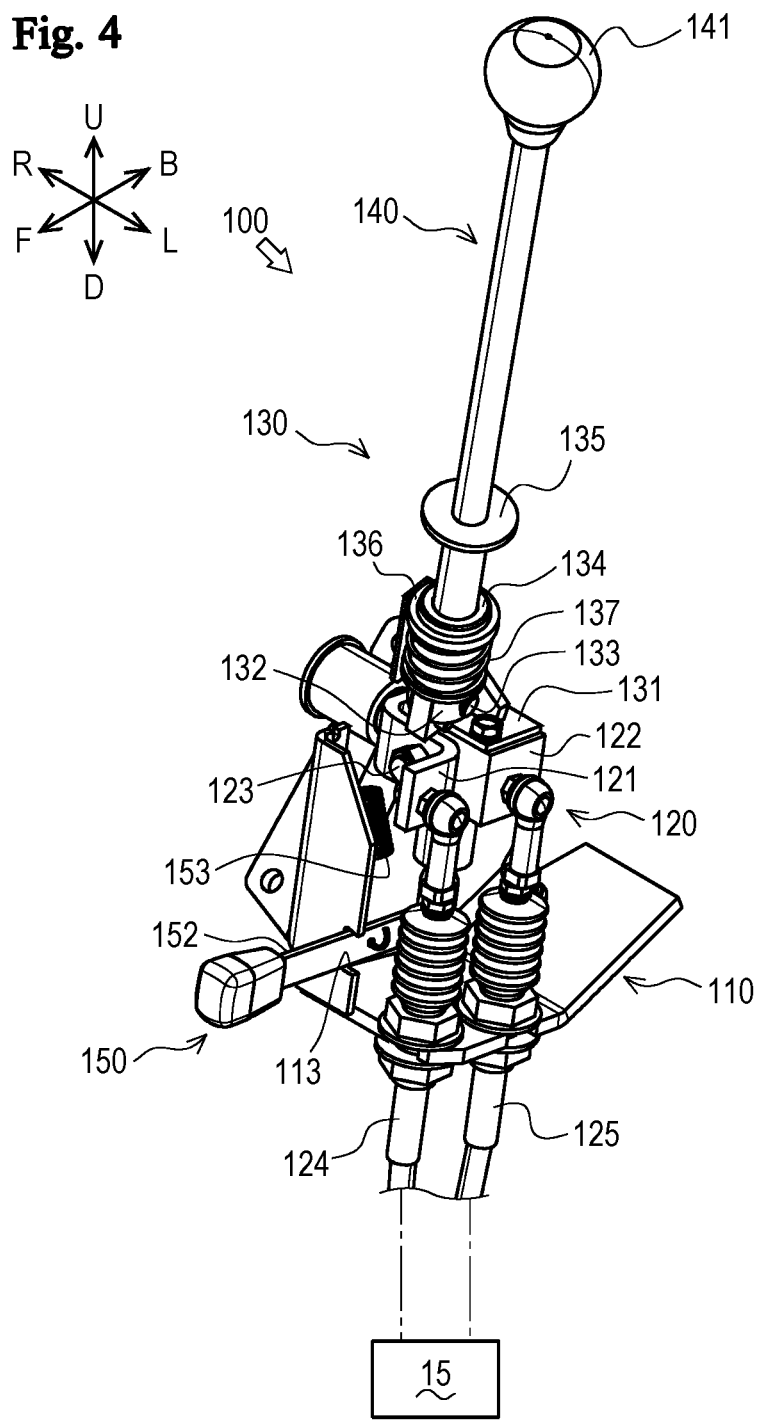
FIG. 4 is a perspective view of an operating mechanism.
Figure 5:
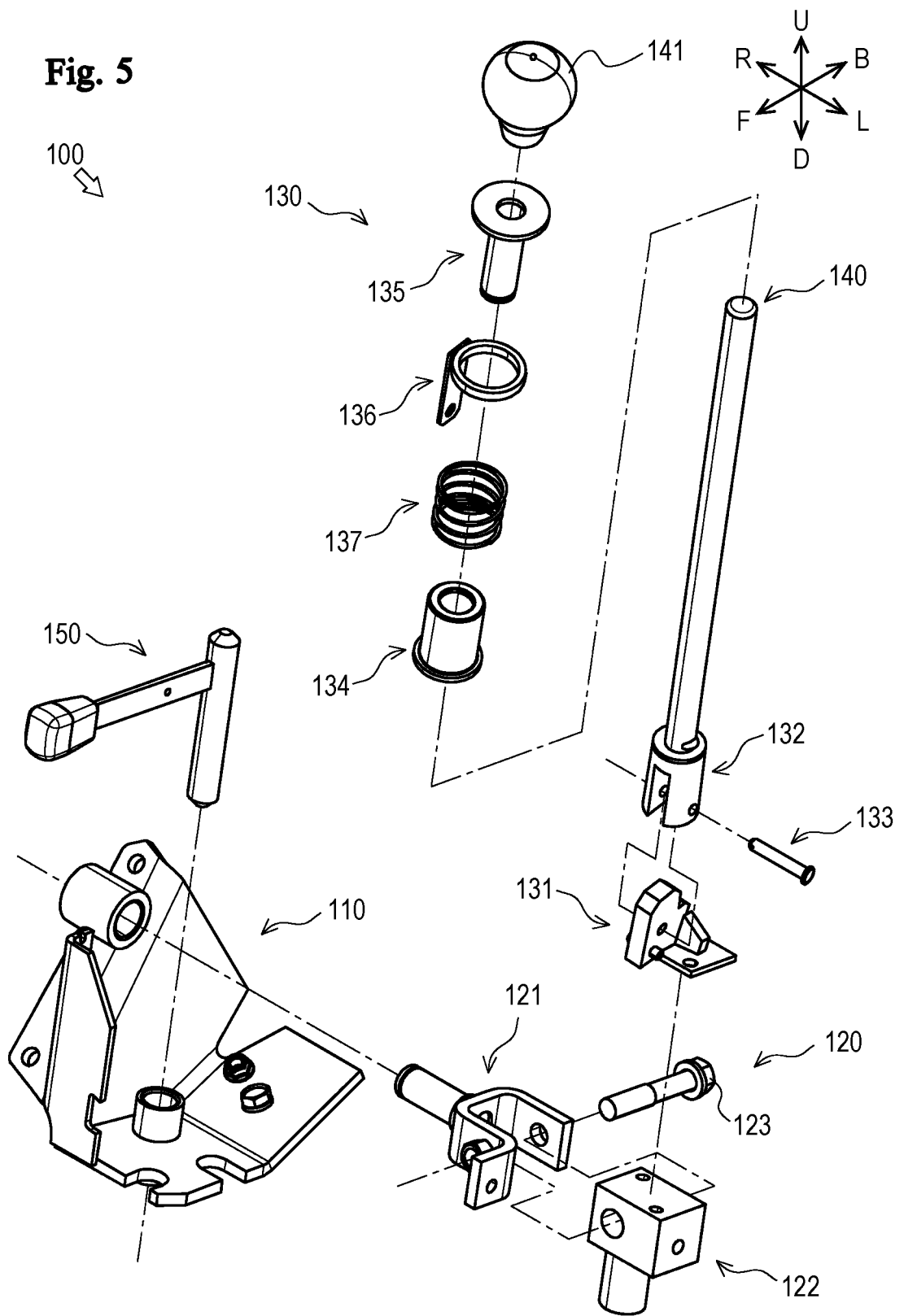
FIG. 5 is an exploded perspective view of the operating mechanism.
Figure 6:
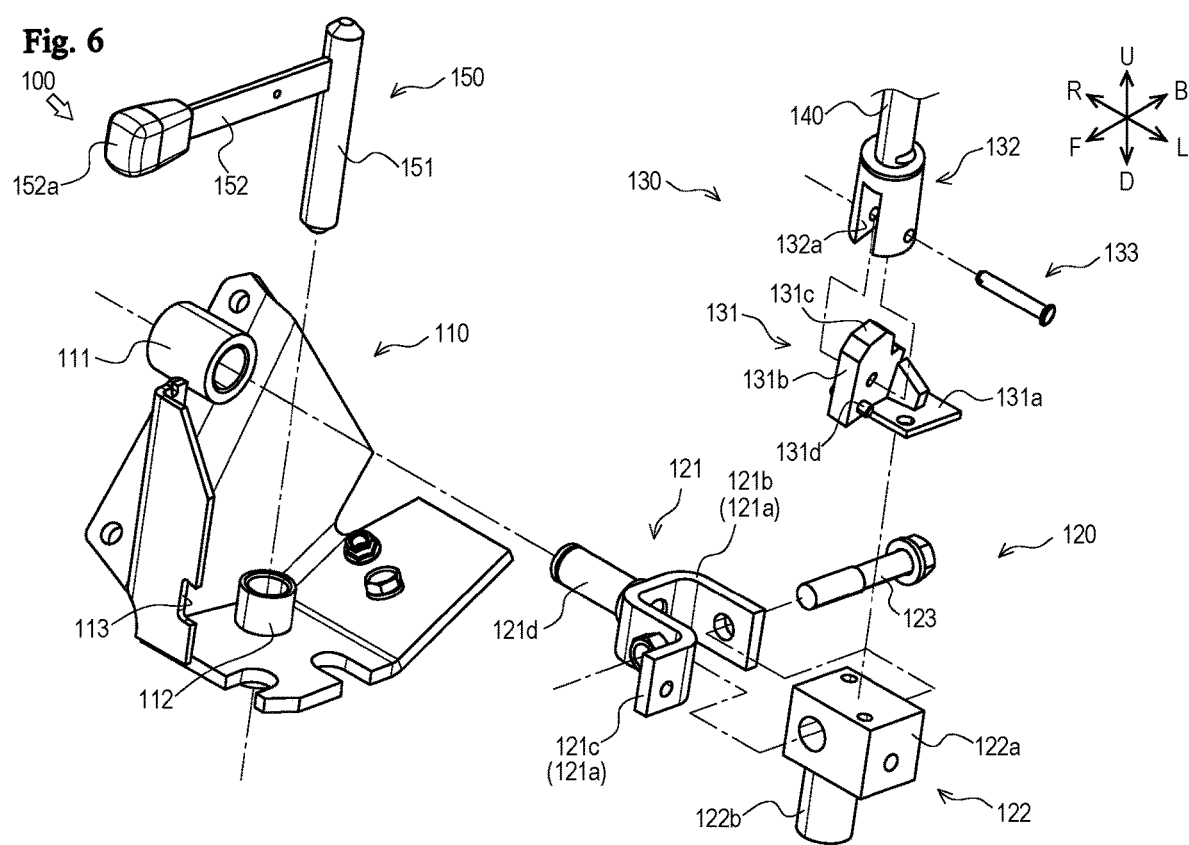
FIG. 6 is an enlarged exploded perspective view of a lower portion of the operating mechanism.
Figure 7:
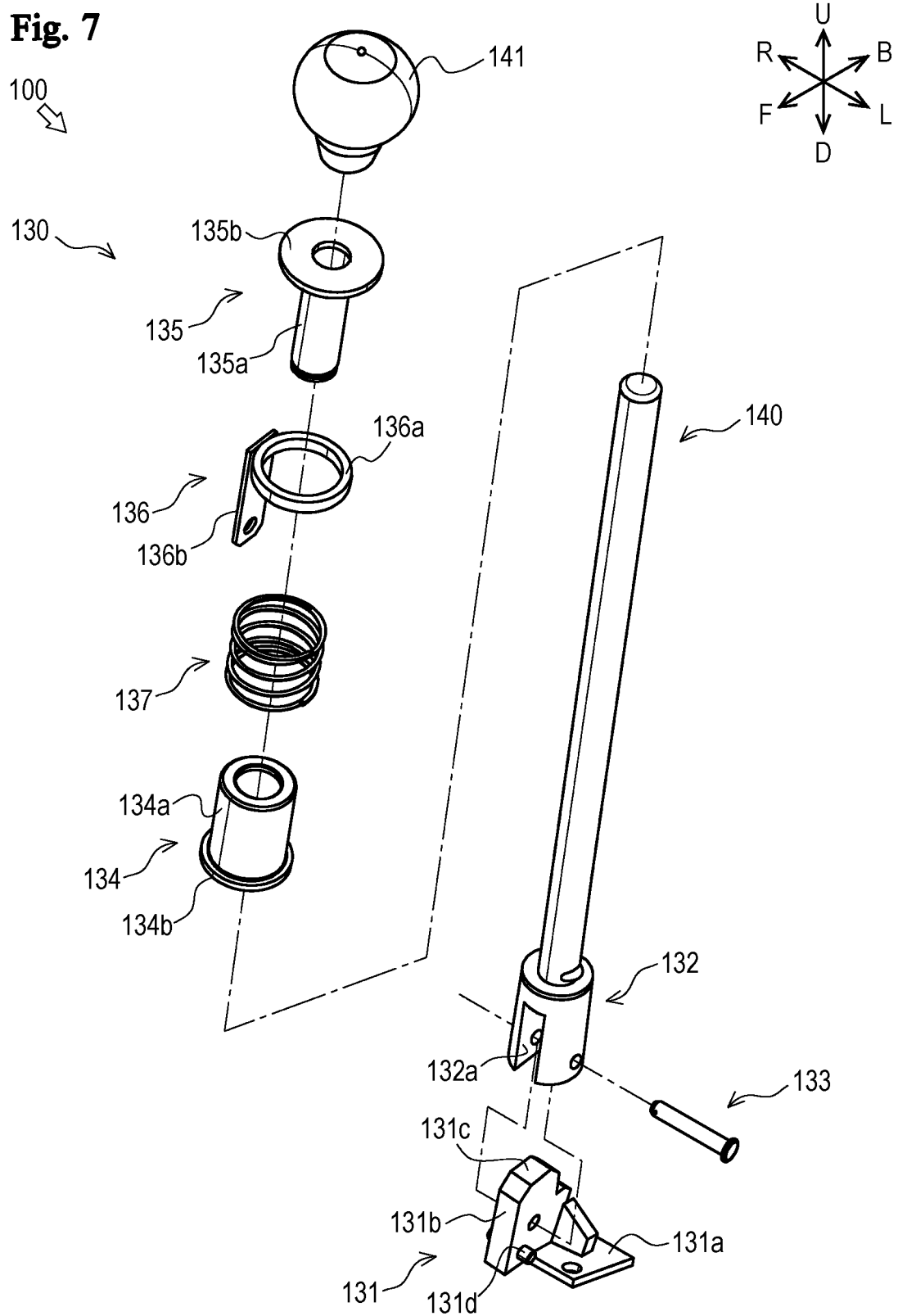
FIG. 7 is an enlarged exploded perspective view of an upper portion of the operating mechanism.

The support portion 110 shown in FIGS. 4 to 6 supports the respective members forming the operating mechanism 100. The support portion 110 is mainly formed by appropriately bending a panel member. On the support portion 110, a bearing portion 111, an insertion portion 112, and an engaging portion 113 are mainly formed.

The bearing portion 111 shown in FIG. 6 is a portion formed in a circular cylindrical shape. The bearing portion 111 is disposed with an axial direction of the bearing portion 111 oriented in a substantially left-right direction. The bearing portion 111 is provided at an upper right portion of the support portion 110.

The insertion portion 112 is a portion formed in a circular cylindrical shape. The insertion portion 112 is disposed with an axial direction of the insertion portion 112 oriented in a substantially up-down direction. The insertion portion 112 is provided at a lower portion of the support portion 110.

The engaging portion 113 is a portion formed by cutting out a part of the support portion 110. The engaging portion 113 is formed at a front portion of the support portion 110.

The transmitting portion 120 shown in FIGS. 4 to 6 transmits a motion corresponding to the operation of the operating portion 140 (described later) to the control valve 15. The transmitting portion 120 mainly includes a front-back rocking portion 121, a left-right rocking portion 122, a coupling pin 123, a first link 124, and a second link 125.

The front-back rocking portion 121 is a portion provided to be able to rock forward and backward. The front-back rocking portion 121 mainly includes a main body portion 121a and a rocking shaft portion 121d.

Figure 8:
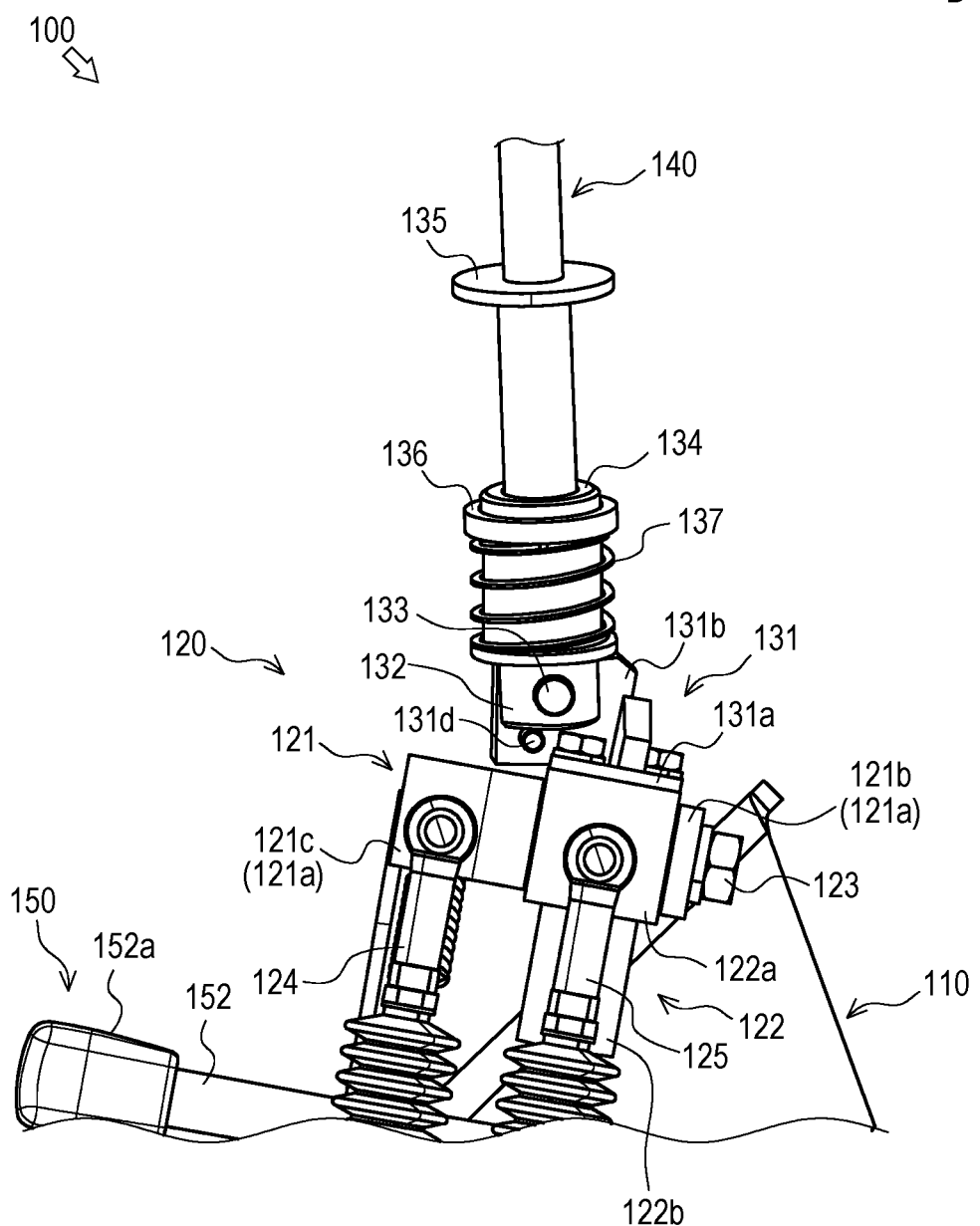
FIG. 8 is a side view of a part including a switching portion of the operating mechanism.
Figure 9:
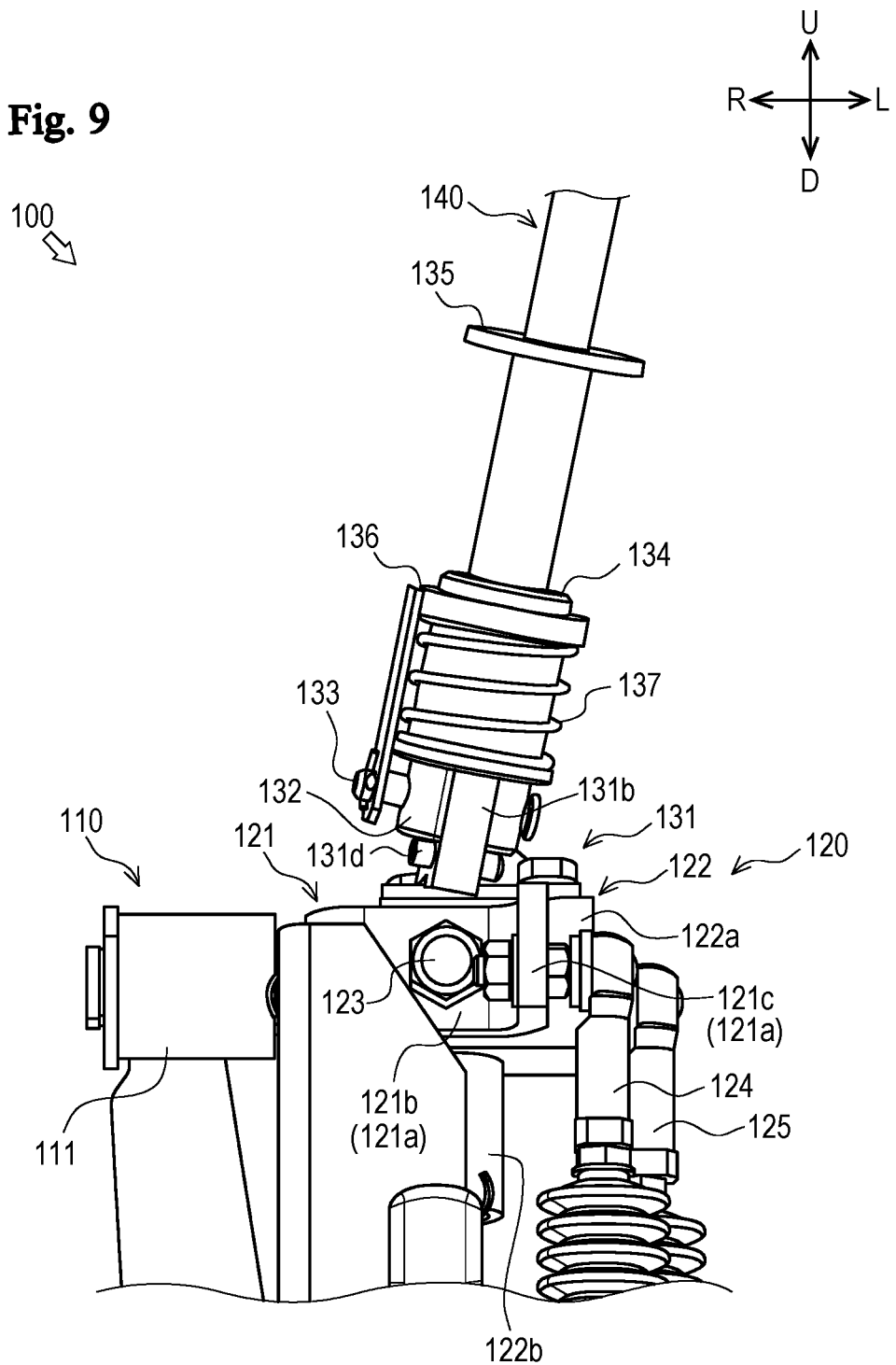
FIG. 9 is a front view of the part including the switching portion of the operating mechanism.

The main body portion 121a shown in FIGS. 6, 8, and 9 is a portion forming a main structural body of the front-back rocking portion 121. The main body portion 121a mainly includes a clamping portion 121b and a coupling portion 121c.

The clamping portion 121b is a portion disposed to clamp the left-right rocking portion 122 (a main body portion 122a described later). The clamping portion 121b is formed in a substantially U shape that is open on a left side in the plan view.

The coupling portion 121c is a portion coupled to the control valve 15 by the first link 124. The coupling portion 121c is formed to protrude forward from a left front end of the clamping portion 121b.

The clamping portion 121b and the coupling portion 121c are integrally formed by appropriately bending a panel member.

The rocking shaft portion 121d is a portion that is a center of rocking of the front-back rocking portion 121. The rocking shaft portion 121d is disposed with an axial direction of the rocking shaft portion 121d oriented in the substantially left-right direction. The rocking shaft portion 121d is provided to protrude rightward from a right side face of the main body portion 121a (the clamping portion 121b).

The rocking shaft portion 121d of the front-back rocking portion 121 is rotatably inserted through the bearing portion 111 of the support portion 110. In this way, the front-back rocking portion 121 can rock forward and backward about the rocking shaft portion 121d.

The left-right rocking portion 122 shown in FIGS. 4 to 6 is a portion provided to be able to rock leftward and rightward. The left-right rocking portion 122 mainly includes the main body portion 122a and an engaging portion 122b.

The main body portion 122a shown in FIGS. 6, 8, and 9 is a portion forming a main structural body of the left-right rocking portion 122. The main body portion 122a is formed in a substantially rectangular parallelepiped shape. The main body portion 122a is disposed inside the clamping portion 121b of the front-back rocking portion 121.

The engaging portion 122b is a portion formed in a circular cylindrical shape. The engaging portion 122b is disposed with an axial direction of the engaging portion 122b oriented in the substantially up-down direction. The engaging portion 122b is formed to protrude downward from a bottom face of the main body portion 122a.

The coupling pin 123 shown in FIGS. 4 to 6 couples the front-back rocking portion 121 and the left-right rocking portion 122 to each other in such a manner that the front-back rocking portion 121 and the left-right rocking portion 122 can rock. The coupling pin 123 is disposed with an axial direction of the coupling pin 123 oriented in the substantially front-back direction. The coupling pin 123 is inserted through the main body portion 121a of the front-back rocking portion 121 and the main body portion 122a of the left-right rocking portion 122 from behind. The left-right rocking portion 122 can rock leftward and rightward about the coupling pin 123 with respect to the front-back rocking portion 121.

The first link 124 shown in FIGS. 4, 8, and 9 couples the front-back rocking portion 121 and the control valve 15. One end of the first link 124 is coupled to the main body portion 121a (the coupling portion 121c) of the front-back rocking portion 121. The other end of the first link 124 is coupled to a predetermined valve provided to the control valve 15. When the front-back rocking portion 121 rocks forward and backward, the motion is transmitted to the control valve 15 through the first link 124. In this way, it is possible to switch between the hydraulic circuits.

The second link 125 couples the left-right rocking portion 122 and the control valve 15. One end of the second link 125 is coupled to a left side face of the main body portion 122a of the left-right rocking portion 122. The other end of the second link 125 is coupled to a predetermined valve provided to the control valve 15. When the left-right rocking portion 122 rocks leftward and rightward, the motion is transmitted to the control valve 15 through the second link 125. In this way, it is possible to switch between the hydraulic circuits.

The switching portion 130 shown in FIGS. 4 to 7 couples the operating portion 140 to the transmitting portion 120 such that the operating portion 140 can rock and restricts rocking of the operating portion 140 with respect to the transmitting portion 120 to thereby cause the transmitting portion 120 to move in conjunction with the operation of the operating portion 140. The switching portion 130 mainly includes a first member 131, a second member 132, a coupling portion 133, a restricting member 134, a restriction operating portion 135, a spring receiving portion 136, and a biasing member 137.

The first member 131 shown in FIGS. 6, 8, 9, and 10 is fixed to the transmitting portion 120. The first member 131 mainly includes a fixing portion 131a and the coupling portion 131b.

The fixing portion 131a is a portion fixed to the transmitting portion 120. The fixing portion 131a is formed in a panel shape with a panel face of the fixing portion 131a oriented in the substantially up-down direction. The fixing portion 131a is fixed to an upper face of the left-right rocking portion 122 (the main body portion 122a).

The coupling portion 131b is a portion coupled to the second member 132. The coupling portion 131b is formed in a panel shape with a panel face of the coupling portion 131b oriented in the substantially left-right direction. The coupling portion 131b is fixed to a right front portion of the fixing portion 131a. The coupling portion 131b is provided to protrude upward from the fixing portion 131a. The coupling portion 131b is provided with a protruding portion 131c and a restricting pin 131d.

Figure 10:
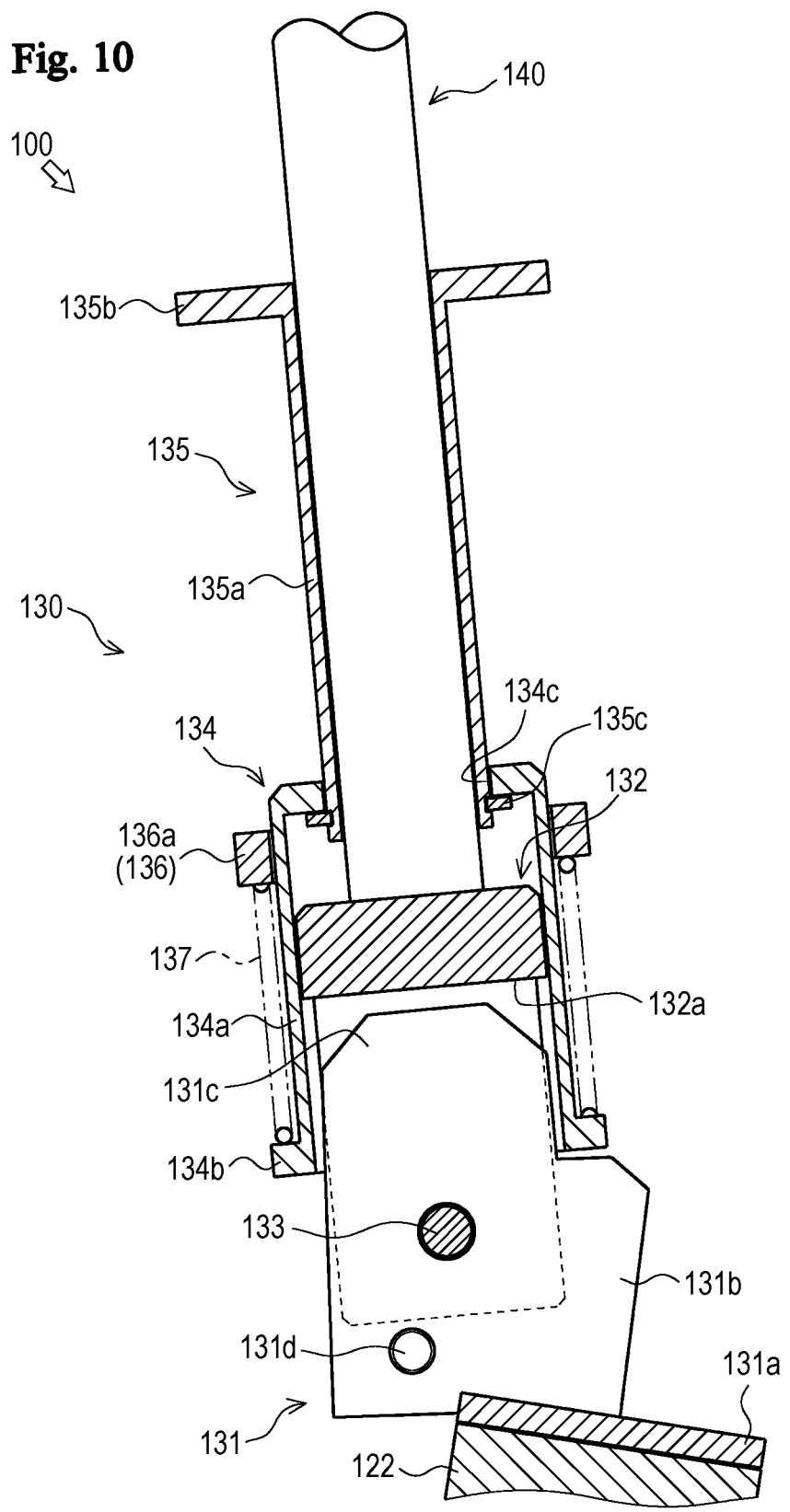
FIG. 10 is a partially sectional view of a second member seen in a direction of a rock axis.

The protruding portion 131c shown in FIGS. 6 and 10 is a portion formed at an upper front portion of the coupling portion 131b. The protruding portion 131c is formed in a substantially rectangular shape in side view. The protruding portion 131c has a front-back width substantially equal to a diameter of the second member 132 (described later).

The restricting pin 131d is a portion formed in a substantially circular columnar shape. The restricting pin 131d is disposed with an axial direction of the restricting pin 131d oriented in the substantially left-right direction. The restricting pin 131d is provided to pass through a lower front portion of the coupling portion 131b in the left-right direction.

The second member 132 shown in FIGS. 6, 8, 9, and 10 is fixed to the operating portion 140. The second member 132 is formed in a substantially circular columnar shape with an axial direction of the second member 132 oriented in the substantially up-down direction. The second member 132 has the diameter substantially equal to the front-back width of the protruding portion 131c of the first member 131. A slit portion 132a is formed in the second member 132.

The slit portion 132a is a groove formed by cutting out a central portion in the left-right direction of the second member 132. The slit portion 132a is formed from a bottom face of the second member 132 to a position in the vicinity of an upper end portion of the second member 132. The slit portion 132a has a left-right width substantially equal to a thickness (a left-right width) of the first member 131. The protruding portion 131c of the first member 131 is inserted into the slit portion 132a.

The coupling portion 133 couples the first member 131 and the second member 132 such that the first member 131 and the second member 132 can rock. The coupling portion 133 is formed in a substantially circular columnar shape. The coupling portion 133 is disposed with an axial direction of the coupling portion 133 oriented in the substantially left-right direction. The coupling portion 133 is inserted through the first member 131 (the coupling portion 131b)

and the second member 132 from a left side. The second member 132 can rock forward and backward about the coupling portion 133 with respect to the first member 131.

The restricting member 134 shown in FIGS. 7 to 10 restricts rocking of the second member 132 with respect to the first member 131. The restricting member 134 mainly includes a cylindrical portion 134a and a flange portion 134b.

The cylindrical portion 134a is a portion formed in a substantially circular cylindrical shape. The cylindrical portion 134a is disposed with an axial direction of the cylindrical portion 134a oriented in the substantially up-down direction. The cylindrical portion 134a is formed in the cylindrical shape with a bottom and a narrowed upper end. The cylindrical portion 134a has an inside diameter substantially equal to the diameter of the second member 132. A through hole 134c is formed in an upper face (a bottom face) of the cylindrical portion 134a.

The flange portion 134b is a substantially annular portion formed to have an expanded diameter from a lower end portion of the cylindrical portion 134a.

The restricting member 134 is provided to be able to slide on the second member 132. To put it concretely, the cylindrical portion 134a of the restricting member 134 is fitted over the second member 132 from above. The cylindrical portion 134a can slide on the second member 132 along the axial direction of the second member 132. In a state shown in FIG. 10, the restricting member 134 is also fitted over the protruding portion 131c of the first member 131 in addition to the second member 132. In this way, by fitting the restricting member 134 over the first member 131 and the second member 132, it is possible to restrict the rocking of the second member 132 with respect to the first member 131.

The restriction operating portion 135 is for operating (sliding) the restricting member 134. The restriction operating portion 135 mainly includes a cylindrical portion 135a and a flange portion 135b.

The cylindrical portion 135a is a portion formed in a substantially circular cylindrical shape. The cylindrical portion 135a is disposed with an axial direction of the cylindrical portion 135a oriented in the substantially up-down direction. The cylindrical portion 135a has an outside diameter substantially equal to an inside diameter of the through hole 134c in the cylindrical portion 134a. The cylindrical portion 135a has an inside diameter substantially equal to an outside diameter of the operating portion 140 (described later).

A lower end portion of the cylindrical portion 135a is inserted through the through hole 134c in the restricting member 134. A snap ring 135c is locked to the lower end of the cylindrical portion 135a on an inner side of the restricting member 134. In this way, it is possible to prevent the cylindrical portion 135a from slipping out of the restricting member 134.

The flange portion 135b is a substantially annular portion formed to have an expanded diameter from an upper end portion of the cylindrical portion 135a.

The spring receiving portion 136 is a portion for receiving the biasing member 137 (described later) between the restricting member 134 and the spring receiving portion 136. The spring receiving portion 136 mainly includes an annular portion 136a and a fixing portion 136b.

The annular portion 136a is a portion formed in an annular shape. The annular portion 136a has an inside diameter substantially equal to an outside diameter of the cylindrical portion 134a of the restricting member 134. The annular portion 136a has an outside diameter substantially equal to an outside diameter of the flange portion 134b of the restricting member 134.

The fixing portion 136b is a portion for fixing the annular portion 136a. The fixing portion 136b is formed in a rectangular panel shape with a longitudinal direction of the fixing portion 136b oriented in the substantially up-down direction. An upper end portion of the fixing portion 136b is fixed to a right end portion of the annular portion 136a.

The annular portion 136a of the spring receiving portion 136 is disposed while fitted over the cylindrical portion 134a of the restricting member 134. A lower end portion of the fixing portion 136b of the spring receiving portion 136 is fixed to a right end portion of the coupling portion 133 inserted through the first member 131 and the second member 132. In this way, the annular portion 136a of the spring receiving portion 136 is disposed while leaving a predetermined clearance from the flange portion 134b of the restricting member 134 in the substantially up-down direction.

The biasing member 137 biases the restricting member 134. The biasing member 137 is formed by a compression coil spring that exerts a biasing force in an extending direction. The biasing member 137 is fitted over the cylindrical portion 134a of the restricting member 134 and is disposed between the flange portion 134b of the restricting member 134 and the annular portion 136a of the spring receiving portion 136. The restricting member 134 is biased toward the first member 131 (in such a direction that the flange portion 134b moves away from the annular portion 136a) by the biasing member 137.

The operating portion 140 is a portion that can be operated by an operator (the driver of the tractor 1). The operating portion 140 is formed in a substantially circular columnar shape. The operating portion 140 is disposed with an axial direction of the operating portion 140 oriented in the substantially up-down direction. A lower end of the operating portion 140 is integrally fixed to an upper face of the second member 132 by welding or the like. The operating portion 140 is disposed coaxially with the second member 132. The operating portion 140 is inserted through the cylindrical portion 135a of the restriction operating portion 135 to be able to slide. A grip 141 that the operator grips in operating the operating portion 140 is fixed to an upper end portion of the operating portion 140.

The lock lever 150 shown in FIGS. 4 to 6 can restrict the motion (the rocking) of the transmitting portion 120. The lock lever 150 mainly includes a restricting portion 151, an arm portion 152, and a biasing member 153.

The restricting portion 151 is a portion that can restrict the motion of the transmitting portion 120 by engaging with the transmitting portion 120. The restricting portion 151 is formed in a substantially circular columnar shape. The restricting portion 151 is disposed with an axial direction of the restricting portion 151 oriented in the substantially up-down direction. A lower portion of the restricting portion 151 is inserted through the insertion portion 112 of the support portion 110 to be able to slide.

The arm portion 152 is a portion that the operator can operate. The arm portion 152 is formed in a substantially rectangular panel shape with a longitudinal direction of the arm portion 152 oriented in the substantially front-back direction. The arm portion 152 is formed to protrude forward from an upper portion (a portion above the portion inserted through the insertion portion 112) of a side face of the restricting portion 151. A grip 152a that the operator grips in operating the arm portion 152 is fixed to a front end portion of the arm portion 152.

The biasing member 153 shown in FIG. 4 biases the restricting portion 151 upward. The biasing member 153 is formed by an extension coil spring that exerts a biasing force in a contracting direction. One end (a lower end) of the biasing member 153 is locked to the arm portion 152. The other end (an upper end) of the biasing member 153 is locked to the support portion 110 at a position above the arm portion 152. In this way, the biasing member 153 biases the restricting portion 151 upward through the arm portion 152.

The operator can grip the arm portion 152 to operate the lock lever 150. By engaging the arm portion 152 in the engaging portion 113 of the support portion 110, it is possible to retain the restricting portion 151 in a state in which the restricting portion 151 is slid downward. In this state, an upper end of the restricting portion 151 is separate from the engaging portion 122b (see FIG. 6) of the transmitting portion 120. If the arm portion 152 and the engaging portion 113 are disengaged from each other, the biasing force of the biasing member 153 can slide the restricting portion 151 upward. If the restricting portion 151 is slid upward, the upper end of the restricting portion 151 is inserted into a lower end of the engaging portion 122b (see FIG. 6) of the transmitting portion 120. In this way, the restricting portion 151 and the transmitting portion 120 are engaged with each other to be able to restrict the motion (the rocking) of the transmitting portion 120.

Figure 3:
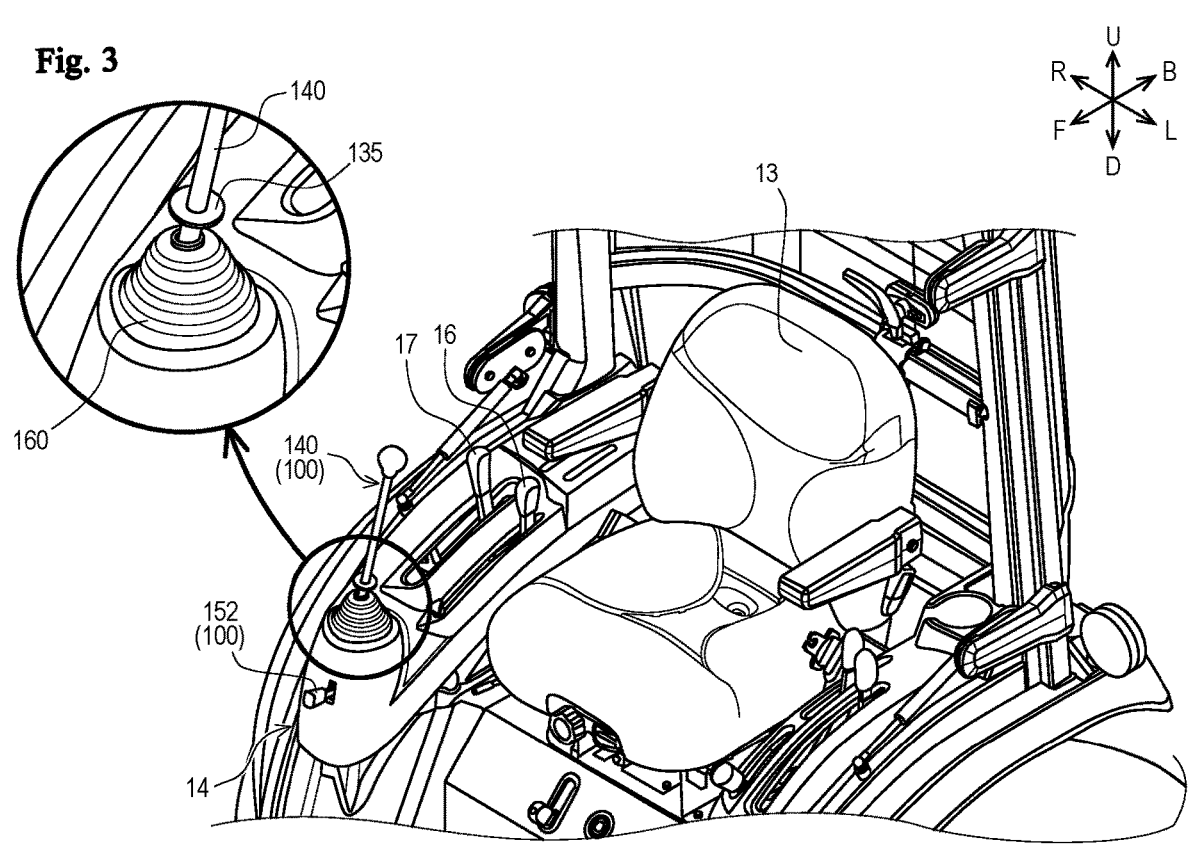
FIG. 3 is a perspective view of the inside of the cabin.

The cover portion 160 shown in FIG. 3 covers a lower portion (the restricting member 134 and the like) of the operating mechanism 100. The cover portion 160 is made of material (rubber or the like) having flexibility. The cover portion 160 is disposed to cover the portion of the operating mechanism 100 excluding the operating portion 140 and the restriction operating portion 135 from above. The operating portion 140 and the restriction operating portion 135 are inserted through an upper end portion of the cover portion 160 and disposed to protrude upward from the cover portion 160. In this way, the operating portion 140 and the restriction operating portion 135 are disposed such that the operator can operate the operating portion 140 and the restriction operating portion 135 from outside the cover portion 160.

Figure 2:
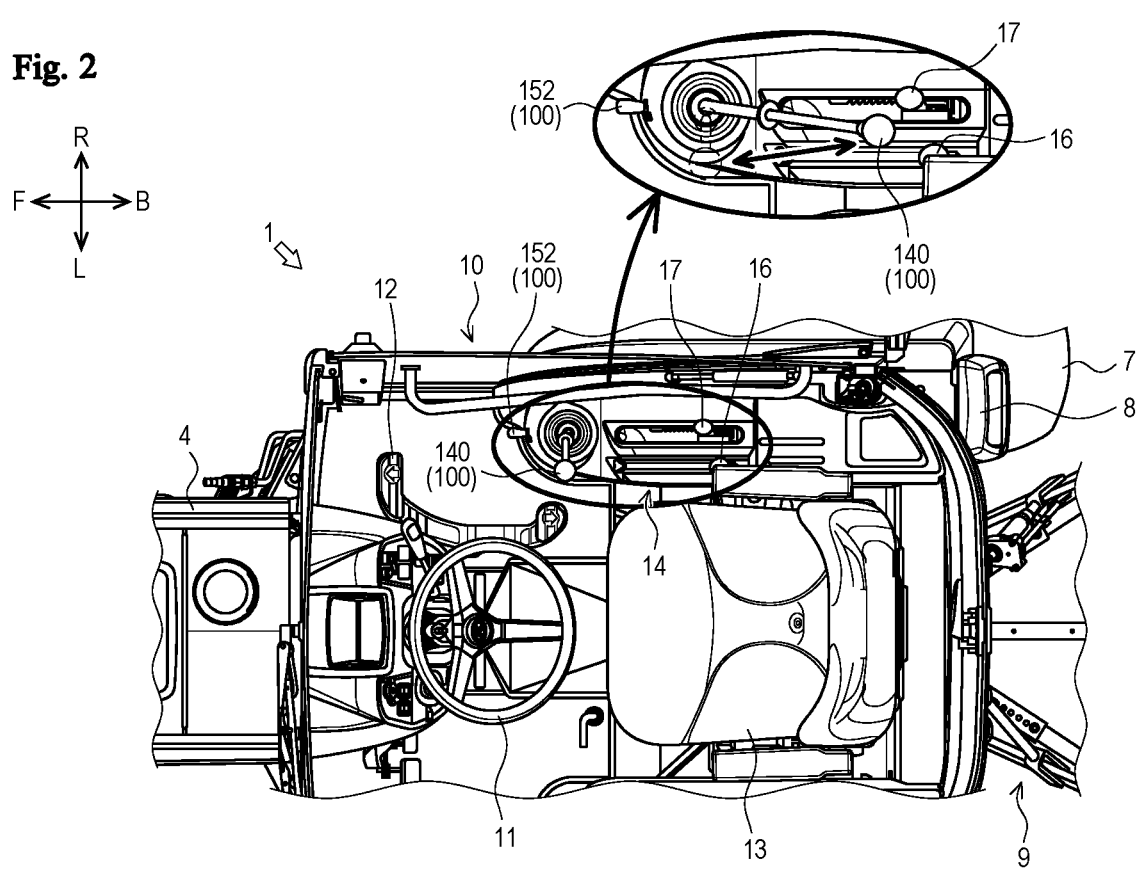
FIG. 2 is a plan view of an inside of a cabin.

The operating mechanism 100 formed as described above is provided to a front end portion of the side console 14 as shown in FIGS. 2 and 3. A portion (a lower portion) of the operating mechanism 100 is housed in the side console 14 and covered with the cover portion 160. The operating portion 140 rises from the front end portion of the side console 14. The arm portion 152 of the lock lever 150 is disposed to protrude forward from a front face of the side console 14.

A method of switching between allowing and not allowing the operating portion 140 to rock with respect to the transmitting portion 120 will be described below.

The operating mechanism 100 can switch between a state in which the operating portion 140 cannot rock with respect to the transmitting portion 120 ("the used state" in which the transmitting portion 120 moves in conjunction with the operation of the operating portion 140) and a state in which the operating portion 140 can rock ("a non-used state") by sliding of the restricting member 134 of the switching portion 130.

In "the used state" shown in FIG. 10, the restricting member 134 is fitted over both of the first member 131 (the protruding portion 131c) and the second member 132. In this state, the second member 132 cannot rock with respect to the first member 131. In other words, the operating portion 140 fixed to the second member 132 cannot rock with respect to the transmitting portion 120 (the left-right rocking portion 122) fixed to the first member 131.

In this state, if the operating portion 140 is rocked forward and backward, the front-back rocking portion 121 (see FIG. 4 and the like) rocks forward and backward through the left-right rocking portion 122. The motion of the front-back rocking portion 121 is transmitted to the control valve 15 through the first link 124. If the operating portion 140 is rocked leftward and rightward, the left-right rocking portion 122 rocks leftward and rightward. The motion of the left-right rocking portion 122 is transmitted to the control valve 15 through the second link 125. In this manner, the operator can use the operating portion 140 in "the used state". In other words, the operator can operate the front loader by appropriately rocking the operating portion 140 forward, backward, leftward, and rightward.

Figure 11:
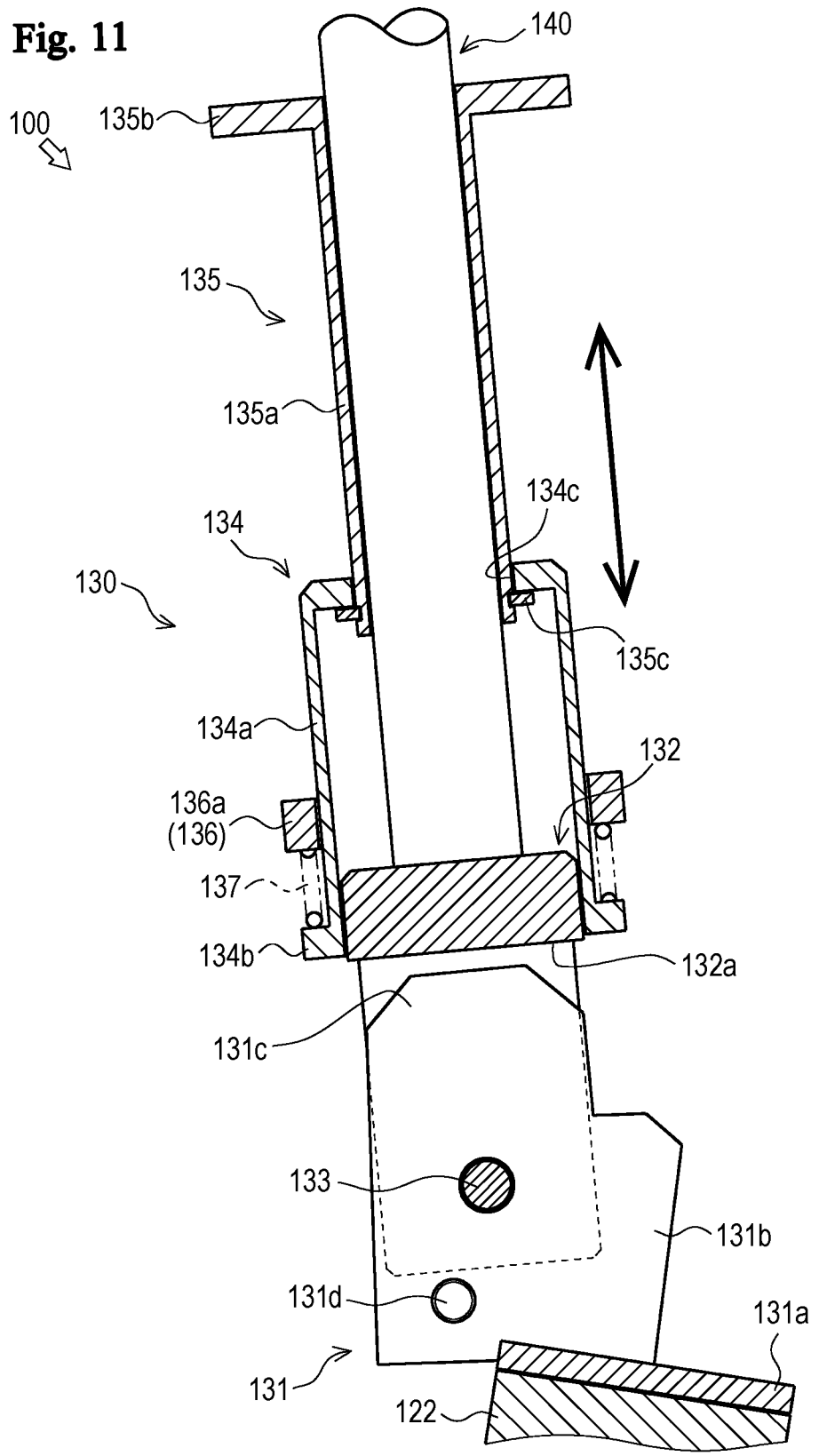
FIG. 11 is a partially sectional view of a restriction operating portion slid upward.

To switch from "the used state" to "the non-used state", the operator pulls the restriction operating portion 135 upward as shown in FIG. 11. In this way, the restriction operating portion 135 slides upward along the axial direction of the operating portion 140. Because an upper portion of the restriction operating portion 135 is not covered with the cover portion 160 (see FIG. 3), the operator can easily operate the restriction operating portion 135.

If the restriction operating portion 135 slides upward, the restricting member 134 also slides upward with the restriction operating portion 135. As shown in FIG. 11, if the restricting member 134 is detached from the first member 131 (the restricting member 134 is only fitted over the second member 132 out of the first member 131 and the second member 132), the second member 132 is allowed to rock with respect to the first member 131. In other words, the operating portion 140 fixed to the second member 132 can rock forward and backward with respect to the transmitting portion 120 (the left-right rocking portion 122) fixed to the first member 131.

Figure 12:
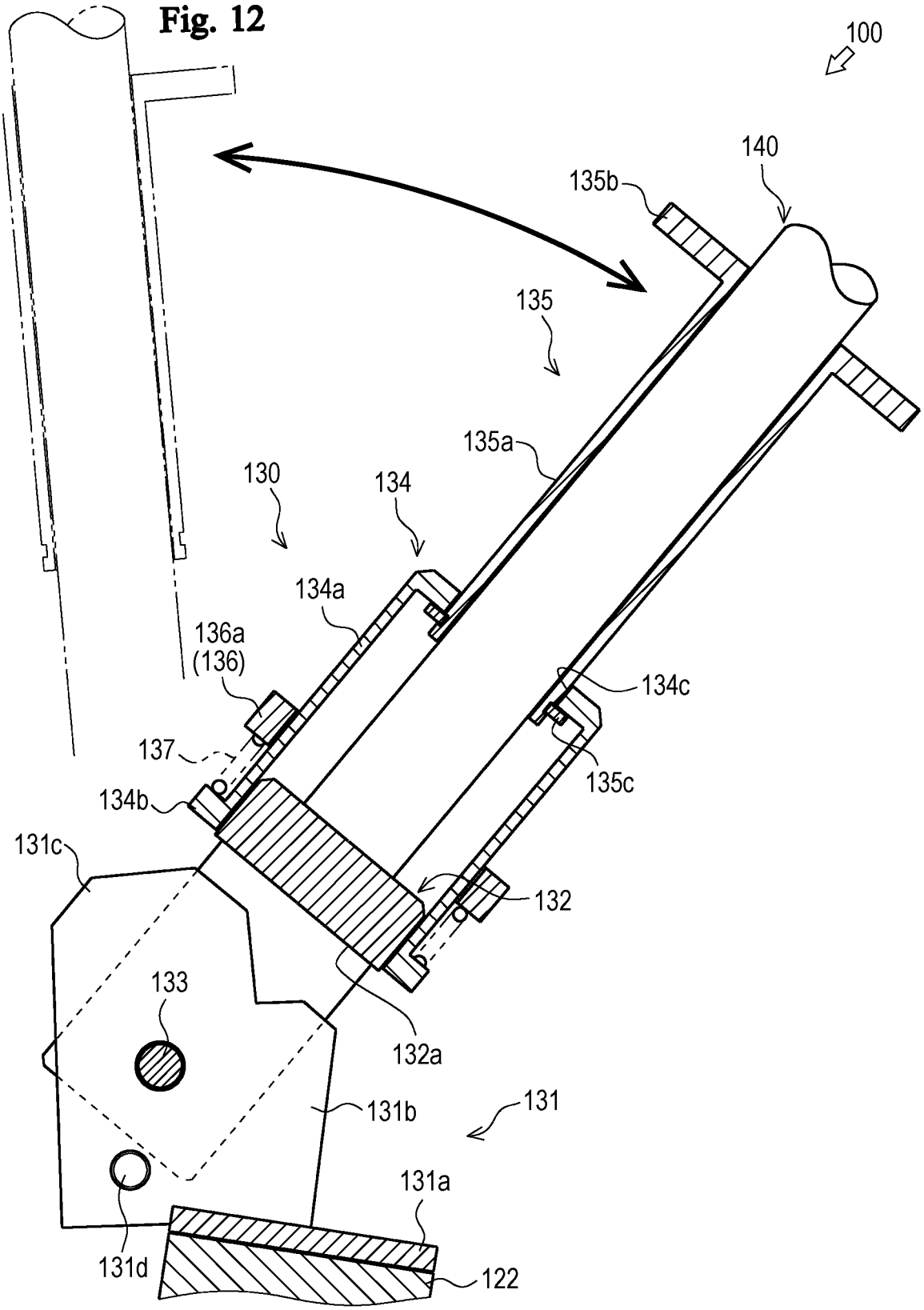
FIG. 12 is a partially sectional view of an operating portion rocked backward.
Figure 13:
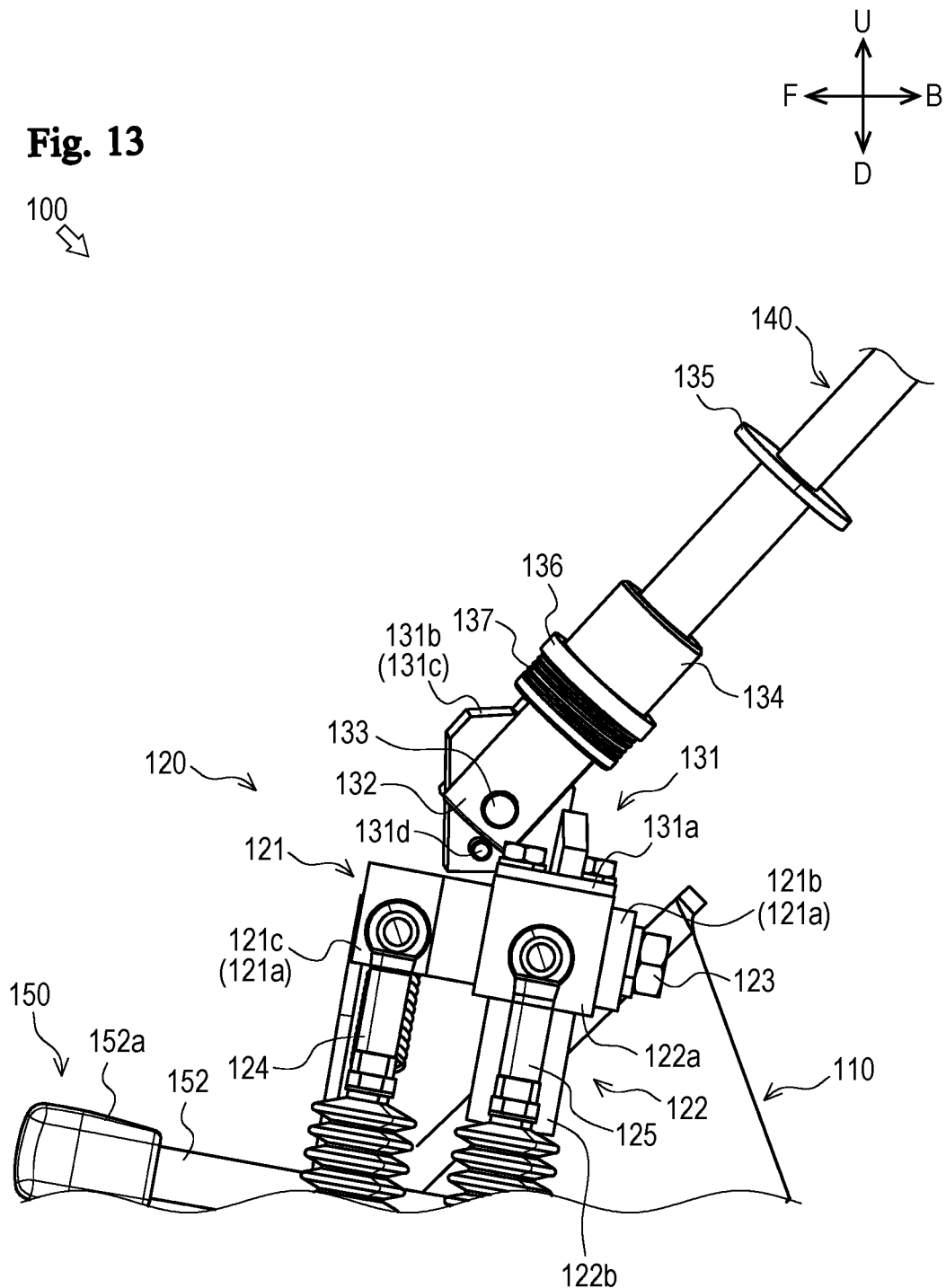
FIG. 13 is a side view of the part including the switching portion of the operating mechanism with the operating portion rocked backward.
Figure 14:
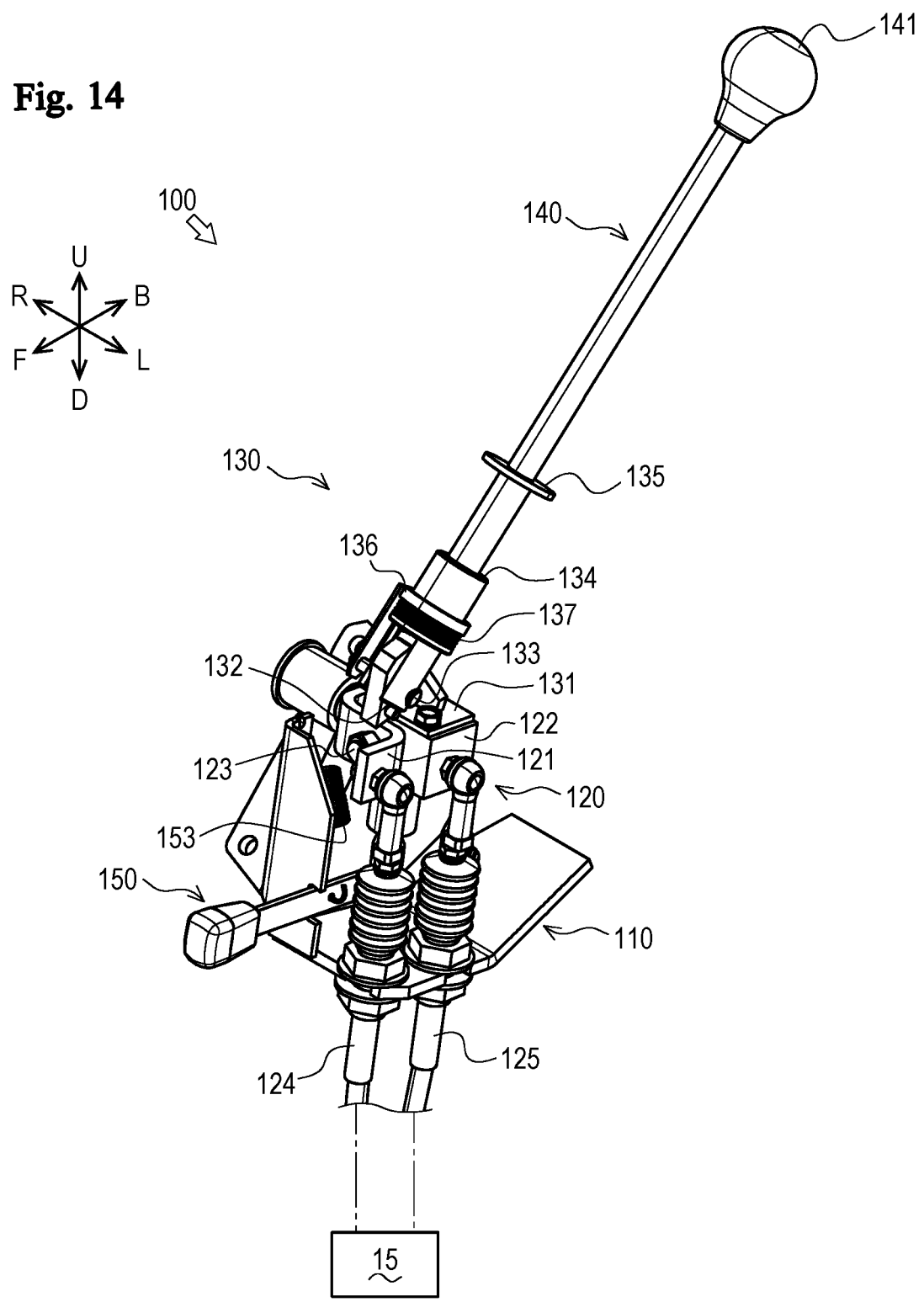
FIG. 14 is a perspective view of the operating mechanism with the operating portion rocked backward.

If the operator rocks the operating portion 140 backward in this state, the operator can tilt the operating portion 140 backward as shown in FIGS. 12 to 14. In the embodiment, it is possible to tilt the operating portion 140 backward until a lower end face of the second member 132 comes in contact with the restricting pin 131d. By sliding the restriction operating portion 135 upward and tilting (folding) the operating portion 140 backward in this manner, it is possible to switch from "the used state" to "the non-used state". In "the non-used state", the operator cannot use the operating portion 140. In other words, in this state, because the interlock between the operating portion 140 and the transmitting portion 120 is released, the front loader is not actuated by the operation of the operating portion 140 and it is impossible to operate the front loader by using the operating portion 140.

As shown in FIGS. 2 and 3, the operator can secure a large space in front of the side console 14 by tilting the operating portion 140 rising from the front end portion of the side console 14 backward (see an enlarged view in FIG. 2). In this way, it is possible to easily pass in front of the side console 14, get in and out through a right door of the tractor 1, and carry out various kinds of maintenance work through the right door.

On the other hand, to switch from "the non-used state" to "the used state", the operator rocks the operating portion 140 forward. If the axial direction of the second member 132 and a protruding direction of the protruding portion 131c of the first member 131 are approximately aligned with each other as shown in FIG. 11, the restricting member 134 slides downward due to the biasing force of the biasing member 137. In this way, as shown in FIG. 10, the restricting member 134 is fitted over both of the first member 131 (the protruding portion 131c) and the second member 132 and the state is switched to "the used state".

In the embodiment, it is possible to approximately align the axial direction of the second member 132 and the protruding direction of the protruding portion 131c of the first member 131 with each other by rocking the operating portion 140 forward until the lower end face of the second member 132 comes in contact with the restricting pin 131d.

As described above, the operating mechanism 100 of the tractor 1 (a work vehicle) according to the embodiment includes:

the operating portion 140 that is provided to the side console 14 (a console) disposed beside the seat 13 and can be operated by the operator; and the switching portion 130 capable of switching between the used state in which the operating portion 140 can be used and the non-used state in which the operating portion 140 cannot be used.

With this configuration, it is possible to suppress obstruction of the motion of the operator by the operating portion 140. In other words, by switching the operating portion 140 to "the non-used state", the operator need not be bothered by interference with the operating portion 140.

The switching portion 130 switches from the used state to the non-used state by folding of the operating portion 140.

With this configuration, it is possible to more effectively suppress the obstruction of the motion of the operator by the operating portion 140. In other words, it is possible to rock the operating portion 140 to such a position that the operating portion 140 does not obstruct the motion of the operator.

The operating mechanism 100 further includes the transmitting portion 120 that transmits the motion to the control valve 15 (a predetermined device), in which the switching portion 130 couples the operating portion 140 to the transmitting portion 120 such that the operating portion 140 can rock, switches to the used state by restricting the rocking of the operating portion 140 with respect to the transmitting portion 120 and enabling the transmitting portion 120 to move in conjunction with the operation of the operating portion 140, and switches to the non-used state by allowing the rocking of the operating portion 140 with respect to the transmitting portion 120 and rocking the operating portion 140 to the predetermined position.

With this configuration, it is possible to suppress obstruction of the motion of the operator by the operating portion 140. In other words, it is possible to rock the operating portion 140 to such a position that the operating portion 140 does not obstruct the motion of the operator.

The predetermined device is the control valve 15 that controls the motion of the front loader.

With this configuration, it is possible to suppress the obstruction of the motion of the operator by the operating portion 140 for operating the front loader.

The switching portion 130 couples the operating portion 140 to the transmitting portion 120 such that the operating portion 140 can rock forward and backward.

With this configuration, it is possible to suppress the obstruction of the motion of the operator in front of and behind the operating portion 140 by the operating portion 140. Especially when the operating portion 140 is provided to the front end portion of the side console 14 as in the embodiment, it is possible to suppress the obstruction of the motion (movement, getting in and out, and the like) of the operator in front of the side console 14 by the operating portion 140.

The switching portion 130 includes the first member 131 fixed to the transmitting portion 120, the second member 132 fixed to the operating portion 140, the coupling portion 133 that couples the first member 131 and the second member 132 such that the first member 131 and the second member 132 can rock, and the restricting member 134 that can restrict the rocking of the second member 132 with respect to the first member 131 by being fitted over the first member 131 and the second member 132 in a state in which the second member 132 rocks to a predetermined position with respect to the first member 131.

With this configuration, it is possible to make a configuration of the switching portion 130 simple.

The restricting member 134 is provided to the second member 132 (one of the first member 131 and the second member 132) to be able to slide in such a direction as to move toward and away from the first member 131 (the other of the first member 131 and the second member 132).

With this configuration, it is possible to make the configuration of the switching portion 130 simpler.

The switching portion 130 further includes the biasing member 137 that biases the restricting member 134 toward the first member 131 (the other of the first member 131 and the second member 132).

With this configuration, it is possible to easily switch to the used state. In other words, when the second member 132 rocks to the predetermined position with respect to the first member 131, it is possible to switch from the non-used state to the used state by automatically sliding the restricting member 134 with the biasing force of the biasing member 137.

The operating mechanism 100 further includes the cover portion 160 that covers the restricting member 134, in which the switching portion 130 further includes the restriction operating portion 135 that can operate the restricting member 134 from outside the cover portion 160.

With this configuration, it is possible to easily switch between the used state and the non-used state. In other words, even if the restricting member 134 is covered with the cover portion 160, it is possible to operate the restricting member 134 by operating the restriction operating portion 135 from outside the cover portion 160.

The tractor 1 according to the embodiment is an embodiment of the work vehicle according to the disclosure.

The control valve 15 according to the embodiment is an embodiment of the predetermined device according to the disclosure.

The side console 14 according to the embodiment is an embodiment of the console according to the disclosure.

Although the embodiment of the disclosure has been described above, the disclosure is not limited to the above-described configuration and can be changed in various ways without departing from a scope of the disclosure described in the claims.

For example, the tractor 1 is shown as an example of the work vehicle in the embodiment, which is not necessarily the case in the disclosure. In other words, the work vehicle may be other agricultural vehicles, construction vehicles, industrial vehicles, and the like.

The operating mechanism 100 is for operating the front loader (the control valve 15) in the embodiment, which is not necessarily the case in the disclosure. In other words, the operating mechanism 100 may be for operating various other devices (e.g., a transmission or the engine 3 of the tractor 1 and various work implements attached to the tractor 1).

The operating mechanism 100 (the operating portion 140) is disposed at the side console 14 in the embodiment, which is not necessarily the case in the disclosure. The operating mechanism 100 may be disposed at other various places (e.g., a steering post provided with the steering wheel 11).

The operating portion 140 is rocked forward and backward in the embodiment, which is not necessarily the case in the disclosure. In other words, a rocking direction of the operating portion 140 can be set arbitrarily. As the direction, it is preferable to appropriately select such a direction that the operating portion 140 does not obstruct the motion (the movement or the like) of the operator.

The specific configuration of the switching portion 130 is not limited to the configuration according to the embodiment and the switching portion 130 may have an arbitrary configuration that can switch between the used state and the non-used state.

For example, although the restricting member 134 restricts the rocking of the second member 132 with respect to the first member 131 by being fitted over the first member 131 and the second member 132 in the embodiment, the configuration for restricting the rocking is not limited to this configuration. For example, a member (a pin or the like) inserted through the first member 131 and the second member 132 may restrict the rocking of the first member 131 and the second member 132.

Although the restricting member 134 is provided to the second member 132 to be able to slide, the restricting member 134 may be provided to the first member 131 to be able to slide.

Although the biasing member 137 biases the restricting member 134 in one direction (toward the first member 131) in the embodiment, the biasing member 137 does not necessarily have to be provided.

The switching portion 130 couples the transmitting portion 120 and the operating portion 140 such that the transmitting portion 120 and the operating portion 140 can rock in the embodiment, which is not necessarily the case in the disclosure. The switching portion 130 only has to couple the operating portion 140 to the transmitting portion 120 such that the operating portion 140 can rock with respect to the transmitting portion 120. For example, the switching portion 130 may enable the operating portion 140 to rock at a middle portion. To put it concretely, the switching portion 130 only has to enable an upper portion (a side of the grip 141) to rock with respect to the lower portion of the operating portion 140. This configuration can allow the operating portion 140 (the side of the grip 141) to rock with respect to the transmitting portion 120.

The restriction operating portion 135 may be provided in the vicinity of the grip 141 of the operating portion 140. For example, the cylindrical portion 135a of the restriction operating portion 135 may be formed to be longer in length and the flange portion 135b may be disposed in the vicinity of the grip 141. In this way, the operator can operate the restriction operating portion 135 while gripping the grip 141, which improves ease of operation.

The folded state of the operating portion 140 is "the non-used state" in the embodiment, which is not necessarily the case in the disclosure. "The used state" in the disclosure only has to be a state in which the operating portion 140 cannot be operated (a state in which the implement (the front loader, in the embodiment) responding to the operating portion 140 cannot be operated by operation of the operating portion 140). Based on the embodiment, for example, a state in which the switching portion 130 simply allows the operating portion 140 to rock with respect to the transmitting portion 120 (a state in which the operating portion 140 is not folded) may be defined as "the non-used state". In this state, even if the operator interferes with the operating portion 140 when performing some kind of motion (movement, various kinds of work, and the like) in the vicinity of the operating portion 140, the implement (the front loader) that responses to the operating portion 140 does not move. Therefore, the operator need not be bothered by the interference with the operating portion 140 and it is possible to suppress the obstruction of the motion of the operator by the operating portion 140.

What is claimed is:

1. An operating mechanism of a work vehicle comprising:
   an operating portion that is provided to a console disposed beside a seat and can be operated by an operator;
   a switching portion capable of switching between a used state in which the operating portion can be used and a non-used state in which the operating portion cannot be used,
   a transmitting portion that transmits a motion to a predetermined device,
   wherein the switching portion
   couples the operating portion to the transmitting portion such that the operating portion can rock,
   switches to the used state by restricting rocking of the operating portion with respect to the transmitting portion and enabling the transmitting portion to move in conjunction with operation of the operating portion, and
   switches to the non-used state by allowing the rocking of the operating portion with respect to the transmitting portion and rocking the operating portion to a predetermined position.

2. The operating mechanism of the work vehicle according to claim 1,
   wherein the predetermined device
   is a control valve that controls a motion of a front loader.

3. The operating mechanism of the work vehicle according to claim 2,
   wherein the switching portion
   couples the operating portion to the transmitting portion such that the operating portion can rock forward and backward.

4. The operating mechanism of the work vehicle according to claim 2,
   wherein the switching portion includes
   a first member fixed to the transmitting portion,
   a second member fixed to the operating portion,
   a coupling portion that couples the first member and the second member such that the first member and the second member can rock, and
   a restricting member that can restrict rocking of the second member with respect to the first member by being fitted over the first member and the second member in a state in which the second member rocks to a predetermined position with respect to the first member.

5. The operating mechanism of the work vehicle according to claim 3,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

6. The operating mechanism of the work vehicle according to claim 1,
wherein the switching portion
couples the operating portion to the transmitting portion such that the operating portion can rock forward and backward.

7. The operating mechanism of the work vehicle according to claim 6,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

8. The operating mechanism of the work vehicle according to claim 1,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

9. The operating mechanism of the work vehicle according to claim 8,
wherein the restricting member
is provided to one of the first member and the second member to be able to slide in such a direction as to move toward and away from the other of the first member and the second member.

10. The operating mechanism of the work vehicle according to claim 9,
wherein the switching portion further includes
a biasing member that biases the restricting member toward the other of the first member and the second member.

11. The operating mechanism of the work vehicle according to claim 8, further comprising
a cover portion that covers the restricting member,
wherein the switching portion further includes
a restriction operating portion that can operate the restricting member from outside the cover portion.

12. An operating mechanism of a work vehicle comprising:
an operating portion that is provided to a console disposed beside a seat and can be operated by an operator;
a switching portion capable of switching between a used state in which the operating portion can be used and a non-used state in which the operating portion cannot be used, wherein the switching portion switches from the used state to the non-used state by folding the operating portion,
a transmitting portion that transmits a motion to a predetermined device,
wherein the switching portion
couples the operating portion to the transmitting portion such that the operating portion can rock,
switches to the used state by restricting rocking of the operating portion with respect to the transmitting portion and enabling the transmitting portion to move in conjunction with operation of the operating portion, and
switches to the non-used state by allowing the rocking of the operating portion with respect to the transmitting portion and rocking the operating portion to a predetermined position.

13. The operating mechanism of the work vehicle according to claim 12,
wherein the predetermined device
is a control valve that controls a motion of a front loader.

14. The operating mechanism of the work vehicle according to claim 13,
wherein the switching portion
couples the operating portion to the transmitting portion such that the operating portion can rock forward and backward.

15. The operating mechanism of the work vehicle according to claim 13,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

16. The operating mechanism of the work vehicle according to claim 12,
wherein the switching portion
couples the operating portion to the transmitting portion such that the operating portion can rock forward and backward.

17. The operating mechanism of the work vehicle according to claim 16,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

18. The operating mechanism of the work vehicle according to claim 12,
wherein the switching portion includes
a first member fixed to the transmitting portion,
a second member fixed to the operating portion,
a coupling portion that couples the first member and the second member such that the first member and the second member can rock, and
a restricting member that can restrict rocking of the second member with respect to the first member by being fitted over the first member and the second member in a state in which the second member rocks to a predetermined position with respect to the first member.

* * * * *